United States Patent [19]
Imoto et al.

[11] Patent Number: 6,068,948
[45] Date of Patent: May 30, 2000

[54] HYDROGEN ABSORBING ALLOY ELECTRODE, METHOD OF FABRICATING HYDROGEN ABSORBING ALLOY ELECTRODE, AND ALKALI SECONDARY BATTERY

[75] Inventors: Teruhiko Imoto, Katano; Yoshinori Matsuura, Hirakata; Nobuyuki Higashiyama, Mino; Mamoru Kimoto, Hirakata; Mitsuzou Nogami, Takatsuki; Ikuo Yonezu; Koji Nishio, both of Hirakata, all of Japan

[73] Assignee: Sanyo Electric Co., Ltd., Moriguchi, Japan

[21] Appl. No.: 08/976,659

[22] Filed: Nov. 24, 1997

[30] Foreign Application Priority Data

Nov. 28, 1996 [JP] Japan .................................. 8-316823

[51] Int. Cl.$^7$ ............................ H01M 4/26; H01M 10/28
[52] U.S. Cl. ........................................ 429/218.2; 420/900
[58] Field of Search ........................... 429/218.2; 420/900

[56] References Cited

U.S. PATENT DOCUMENTS

| 5,518,509 | 5/1996 | Tadokoro et al. . |
| 5,858,571 | 1/1999 | Ishii et al. .................................. 429/59 |

FOREIGN PATENT DOCUMENTS

| 4-179055 | 6/1992 | Japan . |
| 5-225975 | 9/1993 | Japan . |
| 8-279356 | 10/1996 | Japan . |

OTHER PUBLICATIONS

Chemical Abstracts, vol. 119, No. 26, Dec. 27, 1993, abstract No. 275123, Kamiharashi et al.: "Surface Treatment of hydrogen–Absorbing Alloy Anodes for Secondary Alkaline Batteries", based on JP 05190175 A.

Chemical Abstracts, vol. 119, No. 26. (JP 5190175A), Jul. 30, 1993.

Database WP1, Section Ch, Week 9335. (JP92–04317), Aug. 3, 1993.

Patent Abstracts of Japan No. 5–225975, Sep. 3, 1993.

*Primary Examiner*—Maria Nuzzolillo
*Assistant Examiner*—Jennifer O'Malley
*Attorney, Agent, or Firm*—Armstrong, Westerman, Hattori, McLeland & Naughton

[57] ABSTRACT

In the present invention, a hydrogen absorbing alloy treated upon immersed in an acid solution containing at least a quinone compound, a hydrogen absorbing alloy immersed in water to which at least a quinone compound is added, or a hydrogen absorbing alloy treated upon being immersed in an acid solution containing at least a quinone compound and then immersed in water to which at least a quinone compound is added is used for a hydrogen absorbing alloy electrode, and the hydrogen absorbing alloy electrode is used as a negative electrode of an alkali secondary battery.

17 Claims, 2 Drawing Sheets

6,068,948

HYDROGEN ABSORBING ALLOY ELECTRODE, METHOD OF FABRICATING HYDROGEN ABSORBING ALLOY ELECTRODE, AND ALKALI SECONDARY BATTERY

BACKGROUND OF THE INVENTION

1. Field of the Invention

The present invention relates to a hydrogen absorbing alloy electrode used as a negative electrode of an alkali secondary battery such as a nickel-hydrogen secondary battery, a method of fabricating the hydrogen absorbing alloy electrode, and an alkali secondary battery using the hydrogen absorbing alloy electrode, and is characterized in that a hydrogen absorbing alloy used for the hydrogen absorbing alloy electrode is modified, to improve the initial activity thereof in a case where the hydrogen absorbing alloy electrode is used as the negative electrode to increase charging characteristics in the early stages, and prevent the internal pressure of the alkali secondary battery from being increased to improve the initial discharge capacity of the alkali secondary battery.

2. Description of the Related Art

A nickel-hydrogen secondary battery has been conventionally known as one example of an alkali secondary battery. In the nickel-hydrogen secondary battery, a hydrogen absorbing alloy electrode using a hydrogen absorbing alloy has been generally used as its negative electrode.

Examples of the hydrogen absorbing alloy used for the negative electrode include a hydrogen absorbing alloy having a $CaCu_5$-type crystal structure using Misch metal (Mm) which is a mixture of rare earth elements and a Laves hydrogen absorbing alloy.

In each of the hydrogen absorbing alloys, however, a coating of an oxide or the like is generally formed on its surface by natural oxidation, for example. When a hydrogen absorbing alloy electrode is fabricated using such a hydrogen absorbing alloy, and the hydrogen absorbing alloy electrode is used as the negative electrode of the nickel-hydrogen secondary battery, the activity in the early stages of the hydrogen absorbing alloy is low, and hydrogen gas is not sufficiently absorbed in the hydrogen absorbing alloy. As a result, some problems arise. For example, the capacity in the early stages of the nickel-hydrogen secondary battery is decreased, and the internal pressure of the battery is increased by the hydrogen gas.

Therefore, in recent years, a method of immersing a hydrogen absorbing alloy in an acid solution such as hydrochloric acid, to remove a coating of an oxide on the surface of the hydrogen absorbing alloy has been proposed, as disclosed in Japanese Patent Laid-Open No. 225975/1993.

When the hydrogen absorbing alloy is immersed in the acid solution, to remove the coating of the oxide on the surface of the hydrogen absorbing alloy, some active portions appear on the surface of the hydrogen absorbing alloy. However, some problems remain. For example, the active portions thus appearing on the surface are oxidized again, whereby the activity in the early stages of the hydrogen absorbing alloy is not sufficiently improved, and the hydrogen gas is not sufficiently absorbed in the hydrogen absorbing alloy. Therefore, the capacity of the battery is still low, and the internal pressure of the battery is increased.

SUMMARY OF THE INVENTION

An object of the present invention is to improve, in a hydrogen absorbing alloy electrode used as a negative electrode of an alkali secondary battery such as a nickel-hydrogen secondary battery, the activity in the early stages of the hydrogen absorbing alloy electrode which is used as the negative electrode.

Another object of the present invention is to obtain a hydrogen absorbing alloy electrode whose activity in the early stages is improved so that charging and discharging characteristics are increased.

Still another object of the present invention is to improve the initial discharge capacity of an alkali secondary battery using a hydrogen absorbing alloy electrode as its negative electrode and prevent the internal pressure of the battery from being increased.

In a hydrogen absorbing alloy electrode according to the present invention, a hydrogen absorbing alloy treated upon being immersed in an acid solution containing at least a quinone compound, a hydrogen absorbing alloy immersed in water to which at least a quinone compound is added, or a hydrogen absorbing alloy treated upon being immersed in an acid solution containing at least a quinone compound and then immersed in water to which at least a quinone compound is added is used.

Furthermore, in a method of fabricating a hydrogen absorbing alloy electrode according to the present invention, a hydrogen absorbing alloy used for a hydrogen absorbing alloy electrode is treated upon being immersed in an acid solution containing at least a quinone compound, is immersed in water to which at least a quinone compound is added, or is treated upon being immersed in an acid solution containing at least a quinone compound and is then immersed in water to which at least a quinone compound is added.

In an alkali secondary battery according to the present invention, a hydrogen absorbing alloy treated upon being immersed in an acid solution containing at least a quinone compound, a hydrogen absorbing alloy immersed in water to which at least a quinone compound is added, or a hydrogen absorbing alloy treated upon being immersed in an acid solution containing at least a quinone compound and then immersed in water to which at least a quinone compound is added is used as a hydrogen absorbing alloy in a hydrogen absorbing alloy electrode used as its negative electrode.

When the hydrogen absorbing alloy is treated in the acid solution to which at least the quinone compound is added, dissolved oxygen in the acid solution is removed by the quinone compound added to the acid solution, and an oxide on the surface of the hydrogen absorbing alloy is reduced, so that a coating of the oxide on the surface of the hydrogen absorbing alloy is removed. A lot of active portions appear on the surface of the hydrogen absorbing alloy, and the active portions appearing on the surface of the hydrogen absorbing alloy are prevented from being oxidized again by the dissolved oxygen.

When the hydrogen absorbing alloy electrode using the hydrogen absorbing alloy thus treated is used as the negative electrode of the alkali secondary battery such as the nickel-hydrogen secondary battery, hydrogen gas is sufficiently absorbed in the hydrogen absorbing alloy in the hydrogen absorbing alloy electrode from the early stages, so that charging characteristics are improved. Therefore, the internal pressure of the battery is prevented from being increased, and the discharge capacity of the battery is improved.

Furthermore, when the hydrogen absorbing alloy is immersed in the water to which at least the quinone compound is added, dissolved oxygen in the water is removed by the quinone compound, and an oxide on the surface of the hydrogen absorbing alloy is reduced, so that active portions appear on the surface of the hydrogen absorbing alloy, as in the above-mentioned case. Even when the hydrogen absorbing alloy electrode using the hydrogen absorbing alloy is used as the negative electrode of the alkali secondary battery such as the nickel-hydrogen secondary battery, therefore, the hydrogen gas is sufficiently absorbed in the hydrogen absorbing alloy in the hydrogen absorbing alloy electrode from the early stages, so that charging characteristics are improved. Therefore, the internal pressure of the battery is prevented from being increased, and the discharge capacity of the battery is improved.

When the hydrogen absorbing alloy is treated in the acid solution to which at least the quinone compound is added, and the hydrogen absorbing alloy is then immersed in the water to which the quinone compound is added, the hydrogen absorbing alloy can be preserved for a long time period in a preferable state without reducing the characteristics of the hydrogen absorbing alloy treated in the acid solution to which the quinone compound is added.

As the quinone compound added to the acid solution and the water, various types of known quinone and their derivatives can be used. Examples include quinone, o-benzoquinone, p-benzoquinone, anthraquinone, 1,2-naphthoquinone, and 1,4-naphthoquinone.

Furthermore, as the hydrogen absorbing alloy in the present invention, an alloy having a $CaCu_5$-type crystal structure and a C14-type and/or C15-type Laves alloy can be used. The alloy having a $CaCu_5$-type crystal structure is preferably used.

Examples of the alloy having a $CaCu_5$-type crystal structure include an alloy represented by $MmNi_2CoAlMn$ obtained by replacing La in $LaNi_5$ with Mm (Misch metal) which is a mixture of rare earth elements. The alloy is indicated as a general formula by $MmNi_xMl_yM2_z$ (In the formula, Mm is a mixture of rare earth elements, M1 is at least one type of element selected from Co, Al and Mn, M2 is a transition metal other than M1, x is a positive integer, and $4.7 \leq x+y+z \leq 5.4$).

Examples of the Laves alloy include $TiNi_2$ and $Ti_{0.5}Zr_{0.5}Ni_2$. The alloy is indicated by a general formula $AB_2$ (in the formula, A is at least one type of element selected from Ti and Zr, and B is at least one type of element selected from Ni, Co, V, Mn, Fe and Cr).

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
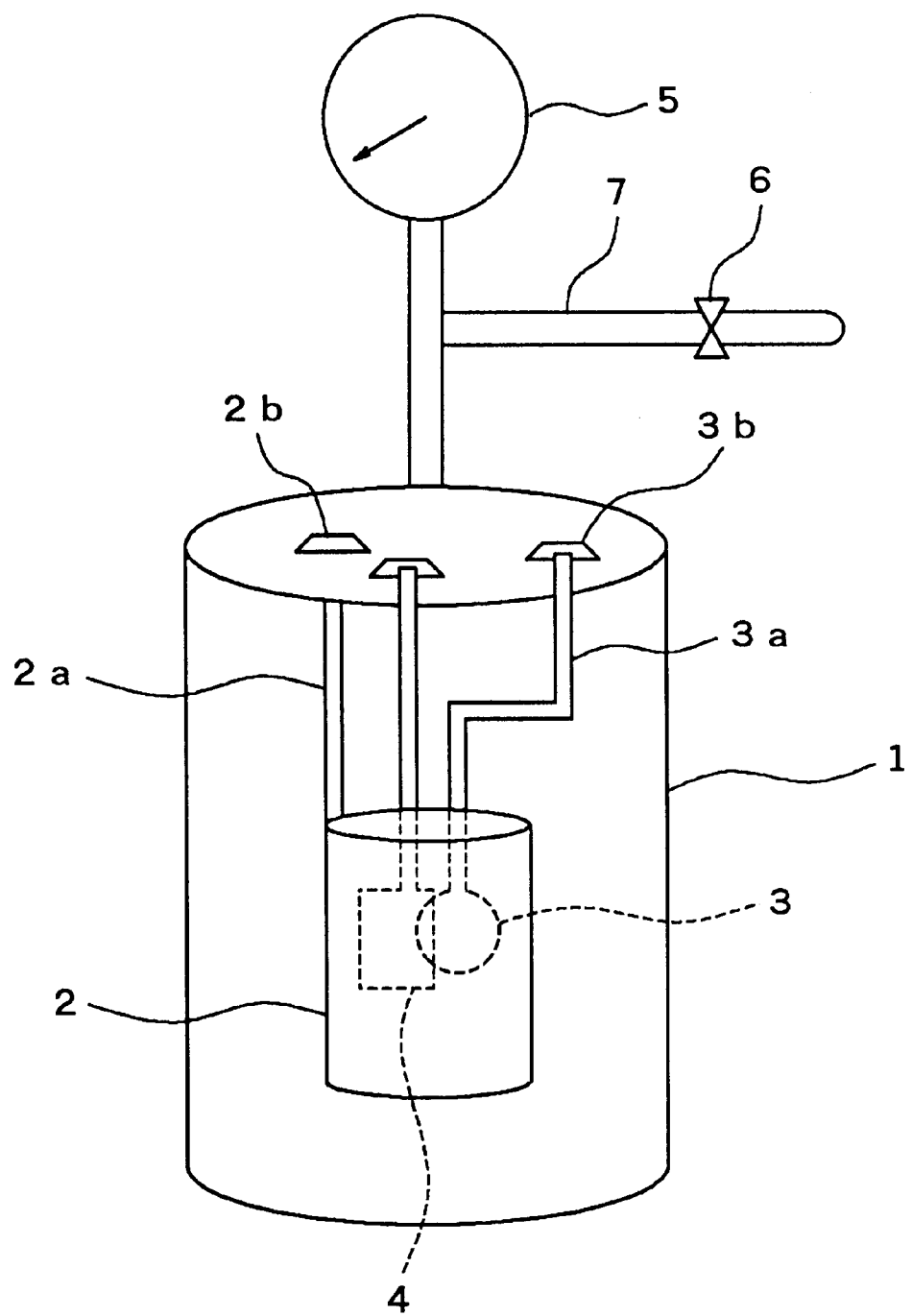
FIG. 1 is a schematic perspective view showing a test cell assembled using each of hydrogen absorbing alloy electrodes in embodiments and comparative examples of the present invention.

A hydrogen absorbing alloy electrode, a method of fabricating the hydrogen absorbing alloy electrode, and an alkali secondary battery according to embodiments of the present invention will be specifically described, and comparative examples will be taken, to make it clear that in an alkali secondary battery using a hydrogen absorbing alloy electrode as its negative electrode, the activity thereof is increased from the early stages so that the initial discharge capacity and the internal pressure characteristics thereof are improved. The hydrogen absorbing alloy electrode, the method of fabricating the hydrogen absorbing alloy electrode, and the alkali secondary battery in the present invention are not particularly limited to those in the foregoing embodiments, and can be embodied upon being suitably changed in the range in which the gist thereof is not changed.

(Embodiment 1)

In the embodiment 1, metal elements Ni, Co, Al and Mn having purity of 99.9% were mixed with Misch metal (Mm) which is a mixture of rare earth elements in the molar ratio of 1.0:3.1:1.0:0:3:0:6. A mixture obtained was melted in high frequency melting furnace in an argon atmosphere, and was then naturally cooled, to produce an ingot of a hydrogen absorbing alloy indicated by a composition formula of $MmNi_{3.1}CoAl_{0.3}Mn_{0.6}$. The ingot of the hydrogen absorbing alloy was mechanically ground in air, to obtain hydrogen absorbing alloy powder having an average particle diameter of 80 $\mu$m.

The hydrogen absorbing alloy powder was immersed in a 0.5 N hydrochloric acid solution to which 50 ppm of quinone was added for two hours under room temperature, to treat the surface of the hydrogen absorbing alloy, after which the hydrogen absorbing alloy was filtered. Thereafter, the hydrogen absorbing alloy was rinsed and dried, to obtain a hydrogen absorbing alloy used for a hydrogen absorbing alloy electrode.

(Comparative examples 1 and 2)

In the comparative examples 1 and 2, the mixture was dissolved by a melting furnace, to obtain hydrogen absorbing alloy powder, as in the above-mentioned embodiment 1.

In the comparative example 1, the hydrogen absorbing alloy powder was used as it was. On the other hand, in the comparative example 2, the hydrogen absorbing alloy powder was immersed in a 0.5 N hydrochloric acid solution to which no quinone was added for two hours under room temperature, to obtain a hydrogen absorbing alloy used for a hydrogen absorbing alloy electrode.

(Embodiment 2)

In the present embodiment 2, hydrogen absorbing alloy powder having the same composition as that in the embodiment 1 was produced by a gas atomizing method, and was then immersed for two hours in a 0.5 N hydrochloric acid solution to which 50 ppm of quinone was added, as in the above-mentioned embodiment 1, to obtain a hydrogen absorbing alloy used for a hydrogen absorbing alloy electrode.

(Comparative examples 3 and 4)

In the comparative examples, the gas atomizing method was used as in the above-mentioned embodiment 2, to produce hydrogen absorbing alloy powder. In the comparative example 3, the hydrogen absorbing alloy powder thus produced was used as it was. On the other hand, in the comparative example 4, the hydrogen absorbing alloy powder was immersed in a 0.5 N hydrochloric acid solution to which no quinone was added for two hours, to obtain a hydrogen absorbing alloy used for a hydrogen absorbing alloy electrode, as in the above-mentioned comparative example 2.

0.1 g of polytetrafluoroethylene which is a binder was mixed with 0.5 g of the hydrogen absorbing alloy powder produced as shown in each of the embodiments 1 and 2 and the comparative examples 1 to 4, a foamed nickel substrate was filled with a mixture obtained, followed by press-molding at a pressure of 1.2 ton/cm², to produce a disk-shaped hydrogen absorbing alloy electrode having a diameter of 20 mm.

The produced hydrogen absorbing alloy electrode in each of the embodiments 1 and 2 and the comparative examples 1 to 4 was used as a test electrode (a negative electrode), while a cylindrical sintered nickel electrode having a sufficiently larger electrochemical capacity than that of the test electrode was used as a counter electrode (a positive electrode), and a plate-shaped sintered nickel electrode was used as a reference electrode, to assemble a test cell as shown in FIG. 1.

In the test cell, a cylindrical sintered nickel electrode 2 to be the above-mentioned counter electrode was held by a positive electrode lead 2a connected to the upper surface of a sealed container 1, and a test electrode 3 was held by a negative electrode lead 3a connected to the upper surface of the sealed container 1, as shown in FIG. 1. The test electrode 3 was vertically positioned in the center of the cylindrical sintered nickel electrode 2, and a plate-shaped sintered nickel electrode 4 to be the above-mentioned reference electrode was also positioned in the cylindrical sintered nickel electrode 2.

Furthermore, terminal portions of the positive electrode lead 2a and the negative electrode lead 3a were exposed to the exterior after penetrating the upper surface of the sealed container 1, and were respectively connected to a positive electrode terminal 2b and a negative electrode terminal 3b. 30% by weight of a potassium hydroxide solution was poured as an alkali electrolyte into the sealed container 1, the cylindrical sintered nickel electrode 2, the test electrode 3 and the plate-shaped sintered nickel electrode 4 were immersed in the alkali electrolyte, and a space of the sealed container 1 in an upper part of the alkali electrolyte was filled with nitrogen gas so that the internal pressure of the test cell would be 5 kgf/cm².

In order to prevent the internal pressure of the sealed container 1 from being increased to not less than a predetermined pressure, a pressure relief valve 7 comprising a pressure indicator 5 and a relief valve 6 was mounted on the center on the upper surface of the sealed container 1.

Each of the test cells using the hydrogen absorbing alloy electrodes in the embodiments 1 and 2 and the comparative examples 1 to 4 was charged for eight hours at a current of 50 mA/g under ordinary temperature and was stopped for one hour, and was then discharged up to a final discharge voltage of 0.9 V at a current of 50 mA/g and was stopped for one hour. The foregoing was taken as one cycle, to achieve charging and discharging, and measure the initial discharge capacity of the test cell. The results were shown in the following Table 1.

20% by weight of a 5% solution of a polyethylene oxide which is a binder was mixed with 100% by weight of the hydrogen absorbing alloy powder produced as shown in each of the embodiments 1 and 2 and the comparative examples 1 to 4, to adjust paste, and the paste was applied to both surfaces of a core composed of a punching metal which was subjected to nickel plating, was dried at room temperature, and was then cut to predetermined lengths, to produce hydrogen absorbing alloy electrodes in the embodiments 1 and 2 and the comparative examples 1 to 4.

Figure 2:
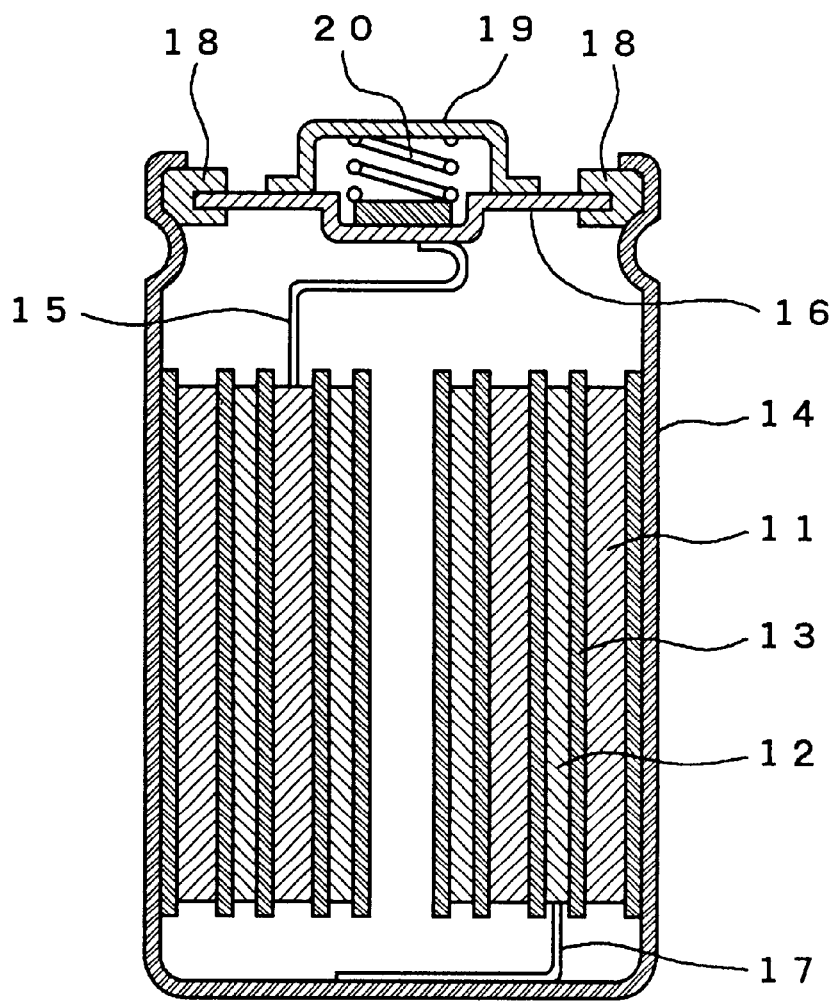
FIG. 2 is a schematic sectional view of an alkali secondary battery fabricated using each of hydrogen absorbing alloy electrodes in embodiments and comparative examples of the present invention.

An alkali secondary battery of AA size in a cylindrical shape (having a capacity of 100 mAh) as shown in FIG. 2 was fabricated using each of the hydrogen absorbing alloy electrodes thus fabricated as its negative electrode, while using a sintered nickel electrode conventionally used as its positive electrode, and using a nonwoven fabric having alkali resistance as a separator.

In each of the alkali secondary batteries, a separator 13 was interposed between the positive electrode 11 and the negative electrode 12, and they were spirally wound and contained in a battery can 14, after which 30% by weight of a potassium hydroxide solution was pored as an alkali electrolyte into the battery can 14, and the battery can 14 was sealed, to connect the positive electrode 11 to a positive electrode cover 16 through a positive electrode lead 15 as well as to connect the negative electrode 12 to the battery can 14 through a negative electrode lead 17 so that the battery can 14 and the positive electrode cover 16 would be electrically separated from each other by an insulating packing 18.

Furthermore, a coil spring 20 was provided between the positive electrode cover 16 and a positive electrode external terminal 19. When the internal pressure of the battery was abnormally increased, the coil spring 20 was compressed so that gas inside the battery would be emitted into air.

Each of the alkali secondary batteries thus produced was charged for six hours at a current of 0.2 C under ordinary temperature, and was then discharged up to 1.0 V at a current of 0.2 C, to find the initial discharge capacity of the alkali secondary battery. The results were together shown in the following Table 1.

TABLE 1

| | fabricating conditions of hydrogen absorbing electrode | | | initial discharge capacity | |
|---|---|---|---|---|---|
| | alloy producing method | presence of acid treatment | presence of quinone | test cell (mAh/g) | alkali secondary battery (mAh) |
| embodiment 1 | melting furnace | yes | yes | 276 | 830 |
| comparative example 1 | melting furnace | no | no | 222 | 620 |
| comparative example 2 | melting furnace | yes | no | 246 | 675 |
| embodiment 2 | atomizing | yes | yes | 277 | 840 |
| comparative example 3 | atomizing | no | no | 170 | 580 |
| comparative example 4 | atomizing | yes | no | 221 | 620 |

As a result, even in a case where the hydrogen absorbing alloy powder was produced by either one of fusion in the melting furnace and the gas atomizing method, when the hydrogen absorbing alloy powder which was subjected to acid treatment in each of the hydrogen absorbing alloys in the embodiments 1 and 2 and the comparative examples 3 and 4, the initial discharge capacities of the test cell and the alkali secondary battery were higher, as compared with those in each of the hydrogen absorbing alloy electrodes in the comparative examples 1 and 2 fabricated using the hydrogen absorbing alloy powder which was not subjected to acid treatment.

Furthermore, when the hydrogen absorbing alloy which was subjected to acid treatment upon adding quinone was used as in each of the hydrogen absorbing alloy electrodes in the embodiments 1 and 2, the initial discharge capacities of the test cell and the alkali secondary battery were improved, as compared with those in each of the hydrogen absorbing alloy electrodes in the comparative examples 2 and 4 using the hydrogen absorbing alloy which was subjected to acid treatment without adding quinone.

Furthermore, each of the alkali secondary batteries fabricated as described above was charged at 1000 mA (1C) under ordinary temperature while measuring the internal pressure of the battery, and a charging time elapsed until the internal pressure of the alkali second battery reaches 10 kgf/cm2 was measured. The charging time was shown as the pressure characteristics in the early stages of the alkali secondary battery in the following Table 2. In determining the internal pressure characteristics, tests were conducted with respect to four alkali secondary batteries, and the average value thereof was shown.

TABLE 2

|  | embodiment 1 | comparative example 1 | comparative example 2 | embodiment 2 | comparative example 3 | comparative example 4 |
|---|---|---|---|---|---|---|
| internal pressure characteristics | 135 min. | 100 min. | 115 min. | 135 min. | 100 min. | 115 min. |

As a result, in each of the alkali secondary batteries using the hydrogen absorbing alloy electrodes in the embodiments 1 and 2 and the comparative examples 3 and 4 fabricated using the hydrogen absorbing alloy which was subjected to acid treatment, the charging time elapsed until the internal pressure of the battery reaches 10 kgf/cm² was longer, as compared with that in each of the alkali secondary batteries using the hydrogen absorbing alloy electrodes in the comparative examples 1 and 2 fabricated using the hydrogen absorbing alloy which was not subjected to acid treatment. When the hydrogen absorbing alloy which was subjected to acid treatment upon adding quinone as in each of the hydrogen absorbing alloy electrodes in the embodiments 1 and 2, the charging time elapsed until the internal pressure of the battery reaches 10 kgf/cm² was further longer, so that the emission of the hydrogen gas in the early stages was further decreased.

(Embodiments 3 to 8 and Comparative examples 5 and 6)

In the embodiments 3 to 8 and the comparative examples 5 and 6, the hydrogen absorbing alloy powder which was treated as shown in the embodiments 1 and 2 and the comparative examples 1 and 3 was used, and was preserved in water for two weeks.

In the embodiments 3 and 4, the hydrogen absorbing alloy powder which was treated as shown in the embodiment 1 was used. In the embodiment 3, the hydrogen absorbing alloy powder was preserved in water to which no quinone was added. On the other hand, in the embodiment 4, the hydrogen absorbing alloy powder was preserved in water to which 20 ppm of quinone was added.

In the embodiments 5 and 6, the hydrogen absorbing alloy powder treated as shown in the embodiment 2 was used. In the embodiment 5, the hydrogen absorbing alloy powder was preserved in water to which no quinone was added. On the other hand, the hydrogen absorbing alloy powder was preserved in water to which 20 ppm of quinone was added.

The hydrogen absorbing alloy powder treated as shown in the comparative example 1 and the hydrogen absorbing alloy powder treated as shown in the comparative example 2 were respectively used in the embodiment 7 and the embodiment 8, and were preserved in water to which 20 ppm of quinone was added.

On the other hand, the hydrogen absorbing alloy powder treated as shown in the comparative example 2 and the hydrogen absorbing alloy powder treated as shown in the comparative example 2 were respectively used in the comparative example 5 and the comparative example 6, and were preserved in water to which no quinone was added.

The hydrogen absorbing alloy powder preserved in the water to which no quinone was added and the hydrogen absorbing alloy power preserved in the water to which quinone was added were used as described above were used, to produce test cells and alkali secondary batteries in the same manner as those in the embodiments 1 and 2 and the comparative examples 1 to 4. The initial discharge capacity of each of the test cells and the alkali secondary batteries was measured as in the above-mentioned case, and the internal pressure characteristics of each of the alkali secondary batteries was measured as in the above-mentioned case. The results thereof were together shown in the following Table 3.

TABLE 3

| | electrode fabricating conditions | | initial discharge capcity | | |
|---|---|---|---|---|---|
| | type of hydrogen absorbing alloy | presence of quinone at the time of preservation in water | test cell (mAh/g) | alkali secondary battery (mAh) | internal pressure characteristics (min.) |
| embodiment 3 | embodiment 1 | no | 270 | 810 | 135 |
| embodiment 4 | embodiment 1 | yes | 280 | 840 | 140 |
| embodiment 5 | embodiment 2 | no | 268 | 805 | 135 |
| embodiment 6 | embodiment 2 | yes | 282 | 830 | 140 |
| embodiment 7 | comparative example 1 | yes | 230 | 635 | 105 |
| embodiment 8 | comparative example 2 | yes | 175 | 580 | 105 |
| comparative example 5 | comparative example 1 | no | 220 | 610 | 100 |
| comparative example 6 | comparative example 2 | no | 165 | 565 | 100 |

As a result, in either one of a case where the hydrogen absorbing alloys in the embodiments 1 and 2 which were treated in the acid solution to which quinone was added were used and a case where the hydrogen absorbing alloys in the comparative examples 1 and 2 which were not treated in the acid solution, when the hydrogen absorbing alloy was preserved in the water to which quinone was added, the initial discharge capacities of the test cell and the alkali secondary battery were improved, and the charging time elapsed until the internal pressure of the alkali secondary battery reaches 10 kgf/cm² was longer, as compared with those in a case where the hydrogen absorbing alloy was preserved in the water to which no quinone was added, so that the emission of the hydrogen gas was decreased.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A hydrogen absorbing alloy electrode including a hydrogen absorbing alloy, wherein a hydrogen absorbing alloy treated upon being immersed in an acid solution to which at least a quinone compound is added is used.

2. The hydrogen absorbing alloy electrode according to claim 1, wherein a hydrogen absorbing alloy obtained by further immersing said hydrogen absorbing alloy in water to which at least a quinone compound is added is used.

3. The hydrogen absorbing alloy electrode according to claim 1, wherein said quinone compound is quinone.

4. The hydrogen absorbing alloy electrode according to claim 1, wherein said hydrogen absorbing alloy is a hydrogen absorbing alloy having a $CaCu_5$-type crystal structure.

5. A hydrogen absorbing alloy electrode including a hydrogen absorbing alloy, wherein a hydrogen absorbing alloy immersed in water to which at least quinone is added is used.

6. The hydrogen absorbing alloy electrode according to claim 5, wherein said hydrogen absorbing alloy is a hydrogen absorbing alloy having a $CaCu_5$-type crystal structure.

7. A method of fabricating a hydrogen absorbing alloy electrode including a hydrogen absorbing alloy, wherein said hydrogen absorbing alloy is treated upon being immersed in an acid solution to which at least a quinone compound is added.

8. The method according to claim 7, wherein said hydrogen absorbing alloy is further immersed in water to which at least a quinone compound is added.

9. The method according to claim 7, wherein said quinone compound is quinone.

10. The method according to claim 7, wherein said hydrogen absorbing alloy is a hydrogen absorbing alloy having a $CaCu_5$-type crystal structure.

11. A method of fabricating a hydrogen absorbing alloy electrode including a hydrogen absorbing alloy, wherein said hydrogen absorbing alloy is immersed in water to which at least quinone is added.

12. The method according to claim 11, wherein said hydrogen absorbing alloy is a hydrogen absorbing alloy having a $CaCu_5$-type crystal structure.

13. An alkali secondary battery using a hydrogen absorbing alloy electrode including a hydrogen absorbing alloy as its negative electrode, wherein a hydrogen absorbing alloy treated upon being immersed in an acid solution to which at least a quinone compound is added is used for the hydrogen absorbing alloy electrode.

14. The alkali secondary battery according to claim 13, wherein a hydrogen absorbing alloy obtained by further immersing said hydrogen absorbing alloy in water to which at least a quinone compound is added is used for the hydrogen absorbing alloy electrode.

15. The alkali secondary battery according to claim 13, wherein said quinone compound is quinone.

16. The alkali secondary battery according to claim 15, wherein said hydrogen absorbing alloy is a hydrogen absorbing alloy having a $CaCu_5$-type crystal structure.

17. An alkali secondary battery using a hydrogen absorbing alloy electrode including a hydrogen absorbing alloy as its negative electrode, wherein a hydrogen absorbing alloy immersed in water to which at least quinone is added is used for the hydrogen absorbing alloy electrode.

* * * * *